United States Patent
Misra et al.

(10) Patent No.: US 11,714,688 B1
(45) Date of Patent: Aug. 1, 2023

(54) SUSTAINABILITY-BASED COMPUTING RESOURCE ALLOCATION

(71) Applicant: Accenture Global Solutions Limited, Dublin (IE)

(72) Inventors: Janardan Misra, Bangalore (IN); Navveen Gordhan Balani, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/056,400

(22) Filed: Nov. 17, 2022

(51) Int. Cl.
 *G06F 9/50* (2006.01)
(52) U.S. Cl.
 CPC .......... *G06F 9/5094* (2013.01); *G06F 9/5077* (2013.01)
(58) Field of Classification Search
 None
 See application file for complete search history.

(56) References Cited

U.S. PATENT DOCUMENTS

| | | | | |
|---|---|---|---|---|
| 8,214,843 B2* | 7/2012 | Boss | ...................... | G06F 9/5094 718/104 |
| 8,230,439 B2* | 7/2012 | Amsterdam | .......... | G06F 9/5094 718/1 |
| 8,365,175 B2* | 1/2013 | Angaluri | ............... | G06F 9/5094 713/340 |
| 8,527,997 B2* | 9/2013 | Bell, Jr. | ................ | G06F 9/5094 713/320 |
| 8,565,931 B2* | 10/2013 | Marwah | ................ | G06F 9/4893 700/28 |
| 8,589,929 B2* | 11/2013 | DeCusatis | ............. | G06F 9/5094 713/320 |
| 9,015,726 B2* | 4/2015 | Barsness | ............... | G06F 9/5094 718/105 |
| 9,098,351 B2* | 8/2015 | Bell, Jr. | ................ | G06F 9/5094 |
| 9,342,376 B2* | 5/2016 | Jain | ......................... | H04L 41/12 |
| 10,423,902 B2* | 9/2019 | Moroo | .................... | G06F 9/505 |
| 10,558,494 B2* | 2/2020 | Crosby | ................. | G06F 9/5094 |
| 11,036,552 B2* | 6/2021 | Chung | .................. | G06F 9/4881 |
| 11,508,021 B2* | 11/2022 | Hovhannisyan | ........................... | G06Q 10/06315 |
| 2010/0138837 A1* | 6/2010 | Olsson | .................. | G06F 9/5094 718/100 |

(Continued)

OTHER PUBLICATIONS

Renugadevi et al.; "Optimized Energy Cost and Carbon Emission-Aware Virtual Machine Allocation in Sustainable Data Centers"; www.mdpi.com/journal/sustainability; Sustainability 2020; (Renugadevi_2020.pdf; pp. 1-27) (Year: 2020).*

(Continued)

*Primary Examiner* — Hiren P Patel
(74) *Attorney, Agent, or Firm* — Fish & Richardson P.C.

(57) ABSTRACT

Methods, computer systems, and apparatus, including computer programs encoded on computer storage media, for allocating computing resources for a data object. The system obtains a plurality of characteristics of a data object, and estimates, from the obtained characteristics, one or more cumulative sustainability metrics characterizing one or more categories of energy consumption during a life-cycle of the data object. The system further determines, from the cumulative sustainability metrics, allocations of one or more computing resources to the data object to optimize one or more objectives including minimizing a cumulative carbon cost during the life-cycle of the data object.

18 Claims, 4 Drawing Sheets

(56) References Cited

U.S. PATENT DOCUMENTS

| | | | | |
|---|---|---|---|---|
| 2013/0290511 | A1* | 10/2013 | Tu | G06F 9/5072 |
| | | | | 709/224 |
| 2014/0149779 | A1* | 5/2014 | Allen-Ware | G06F 11/3013 |
| | | | | 713/340 |
| 2016/0054775 | A1* | 2/2016 | Rajappa | G06F 1/30 |
| | | | | 713/320 |
| 2016/0224396 | A1* | 8/2016 | Brock | G06F 11/3013 |
| 2022/0326991 | A1* | 10/2022 | Poornachandran | G06F 9/3836 |

OTHER PUBLICATIONS

Wang et al.; "Sustainability-aware Resource Provisioning in Data Centers"; 2020 IEEE 6th International Conference on Collaboration and Internet Computing; (Wang_2020.pdf; pp. 60-69) (Year: 2020).*

* cited by examiner

SUSTAINABILITY-BASED COMPUTING RESOURCE ALLOCATION

FIELD

This specification relates to allocating computing resources to computer data storage and operations. In particular, this specification relates to allocating computing resources to the storage and operations of computer data objects based on sustainability.

BACKGROUND

Cloud computing, i.e., the delivery of computing services including processing, storage, databases, networking, software, and analytics over the Internet has become vital for many reasons, including cost-effectiveness, flexibility, scalability, and security. Considerations of the environmental and energy consumption impacts of cloud computing are becoming increasingly important given the projected growth of cloud computing.

SUMMARY

This specification describes computer-implemented systems and methods for performing sustainability-based allocation of computing resources to data objects.

In this specification, a data object refers to a collection of attributes or data values that are stored and accessed electronically. Examples of data objects include electronic document files (e.g., WORD, PDF, or HTML files), multimedia files (e.g., MP3, MP4, or AVI files), database files (e.g., DB, MDB, or SQL files), executable files (EXE, ELF, or BAT files), and so on.

In this specification, computing resources for a data object include any hardware or software connected to or used in connection with the data object. In particular, computing resources can include data storage resources (e.g., data storage platforms such as data servers) for storing the data object, data processing resources (e.g., data processing platforms such as processing servers), and network resources (e.g., communication networks).

In one particular aspect, the specification provides an allocation method for performing sustainability-based allocation of computing resources to data objects. The method can be performed by an allocation system including one or more computers.

The allocation system obtains a plurality of characteristics of a data object, and estimates, from the obtained characteristics, one or more cumulative sustainability metrics characterizing one or more categories of energy consumption during a life-cycle of the data object. The system further determines, from the cumulative sustainability metrics, allocations of one or more computing resources to the data object to optimize one or more objectives including minimizing a cumulative carbon cost during the life-cycle of the data object.

In some implementations of the allocation method, the data object includes one or more of: an electronic document file, a multimedia file, a database file, and/or an executable file.

In some implementations of the allocation method, the one or more cumulative sustainability metrics include one or more of: a cumulative functional sustainability metric characterizing energy consumption related to information contents of the data object during the life-cycle of the data object, a cumulative structural sustainability metric characterizing energy consumption related to data types of the data object during the life-cycle of the data object, a cumulative operational sustainability metric characterizing energy consumption related to operations for accessing the data object during the life-cycle of the data object, and/or a cumulative strategic sustainability metric characterizing energy consumption related to maintaining strategic criticality of the data object during the life-cycle of the data object.

In some implementations of the allocation method, to estimate the cumulative functional sustainability metric, the system estimates, from one or more of the plurality of characteristics of the data object, one or more of: an information uniqueness parameter characterizing an amount of unique information contained in the data object, and/or a semantic correlation parameter characterizing a proximity of the data object with other data objects in a corpus data objects in a data semantics space. The system estimates the cumulative functional sustainability metric from the information uniqueness parameter and/or the semantic correlation parameter. For example, the system can process the information uniqueness parameter and the semantic correlation parameter using a machine-learning model to compute the cumulative functional sustainability metric.

In some implementations of the allocation method, to estimate the cumulative structural sustainability metric, the system estimates, from one or more of the plurality of characteristics of the data object, one or more of: a type heterogeneity parameter characterizing a variation of types of constituent elements in the data object, a compressibility parameter characterizing an intrinsic redundancy of the constituent elements in the data object, and/or a type-complexity parameter characterizing a structural complexity of the constituent elements in the data object. The system estimates the cumulative structural sustainability metric from the one or more of the type heterogeneity parameter, the compressibility parameter, or the type-complexity parameter. For example, the system can process the type heterogeneity parameter, the degree of compressibility parameter, and the type-complexity parameter using a machine-learning model to compute the cumulative functional sustainability metric.

In some implementations of the allocation method, to estimate the cumulative operational sustainability metric, the system estimates, from the one or more of the plurality of characteristics of the data object, one or more of: an access rate parameter characterizing a rate of access to the data object, and/or an update rate parameter characterizing a rate of updating the data object. The system estimates the cumulative operational sustainability metric from the access rate parameter and/or the update rate parameter. For example, the system can process the access rate parameter and the update rate parameter using a machine-learning model to compute the cumulative operational sustainability metric.

In some implementations of the allocation method, to estimate the cumulative strategic sustainability metric, the system estimates, from the one or more of the plurality of characteristics of the data object, a strategic criticality parameter characterizing a strategic significance of the data object for an operating environment the data object operates in. The system estimates the cumulative strategic sustainability metric from the strategic criticality parameter.

In some implementations of the allocation method, the system further estimates, from the determined allocations of one or more computing resources, an energy consumption level during the life-cycle of the data object.

In some implementations of the allocation method, determining the optimized allocation of the one or more computing resources to the data object includes one or more of: determining an optimized allocation of a data storage resource to the data object, determining an optimized allocation of a data processing resource to the data object, and/or determining an optimized allocation of a network resource to the data object.

In some implementations of the allocation method, to determine an optimal data storage platform to be allocated to the data object, the system estimates from a plurality of data storage platforms, for each respective data storage platform in the plurality of data storage platforms, a respective suitability score for the respective data storage platform based on (1) the one or more of cumulative sustainability metrics and (2) one or more respective characteristic parameters of the respective data storage platform. The system selects the data storage platform having the maximum suitability score among the plurality of data storage platforms as the optimal data storage platform.

For example, the one or more respective characteristic parameters of the respective data storage platform can include a respective cost and a respective reliability parameter of the respective data storage platform. To estimate the respective suitability score for the respective data storage resource, the system can process an input specifying (1) the one or more of cumulative sustainability metrics and (2) the respective cost and the respective reliability parameter of the respective data storage platform using a machine-learning model to compute the respective suitability score.

In some implementations of the allocation method, to determine an optimal data processing platform to be allocated to the data object from a plurality of data processing platforms, the system estimates, for each respective processing platform in the plurality of processing platforms, a respective suitability score for the respective data processing platform based on (1) the one or more of cumulative sustainability metrics and (2) one or more respective characteristic parameters of the respective processing platform. The system selects the data processing platform having the maximum suitability score among the plurality of data processing platforms as the optimal data processing platform.

For example, the one or more respective characteristic parameters of the respective data processing platform include a respective primary memory size and a respective floating point operations per second (FLOPS) of the respective data processing platform. To estimate the respective suitability score for the respective data processing platform, the system can process an input specifying (1) the one or more of cumulative sustainability metrics and (2) the respective primary memory size and the respective FLOPS of the respective data processing platform using a machine-learning model to compute the respective suitability score.

In some implementations of the allocation method, to determine an optimal network to be allocated to the data object from a plurality of networks, the system estimates, for each respective network in the plurality of networks, a respective suitability score for the respective network based on (1) the one or more of cumulative sustainability metrics and (2) one or more respective characteristic parameters of the respective network. The system selects the network having the maximum suitability score among the plurality of networks as the optimal network.

For example, the one or more respective characteristic parameters of the respective network comprise a respective bandwidth and a respective reliability measure of the respective network. To estimate the respective suitability score for the respective network, the system can process an input specifying (1) the one or more of cumulative sustainability metrics and (2) the respective bandwidth and the respective reliability measure of the respective network using a machine-learning model to compute the respective suitability score.

In another aspect, this specification provides a system comprising one or more computers and one or more storage devices storing instructions that when executed by the one or more computers cause the one or more computers to perform the methods described above.

In another aspect, this specification provides one or more non-transitory computer storage media encoded with instructions that, when executed by one or more computers, cause the one or more computers to perform the methods described above.

The subject matter described in this specification can be implemented in particular embodiments so as to realize one or more of the following advantages.

The described techniques provide a method for allocating computing resources to data objects. In particular, this specification provides techniques for allocating different types of computing resources to data objects based on cumulative sustainability metrics characterizing energy consumption during the life-cycles of the data objects. Compared with conventional methods, the provided techniques improve longer-term carbon cost saving by minimizing a cumulative carbon cost during the life-cycles of the data objects. The techniques provided by this specification can also be used for computing resource planning, such as budget allocations to acquire those computing resources, that optimizes long-term carbon cost saving for a project involving data object management. In addition, the cumulative sustainability metrics of the data-objects provided by this specification can be further used to design new data-management processes or improve existing processes, which can use the sustainability metric as additional parameters while making decisions regarding managing data.

BRIEF DESCRIPTION OF THE DRAWINGS

Like reference numbers and designations in the various drawings indicate like elements.

DETAILED DESCRIPTION

This specification provides techniques for allocating computing resources to a plurality of databases.

Figure 1A:
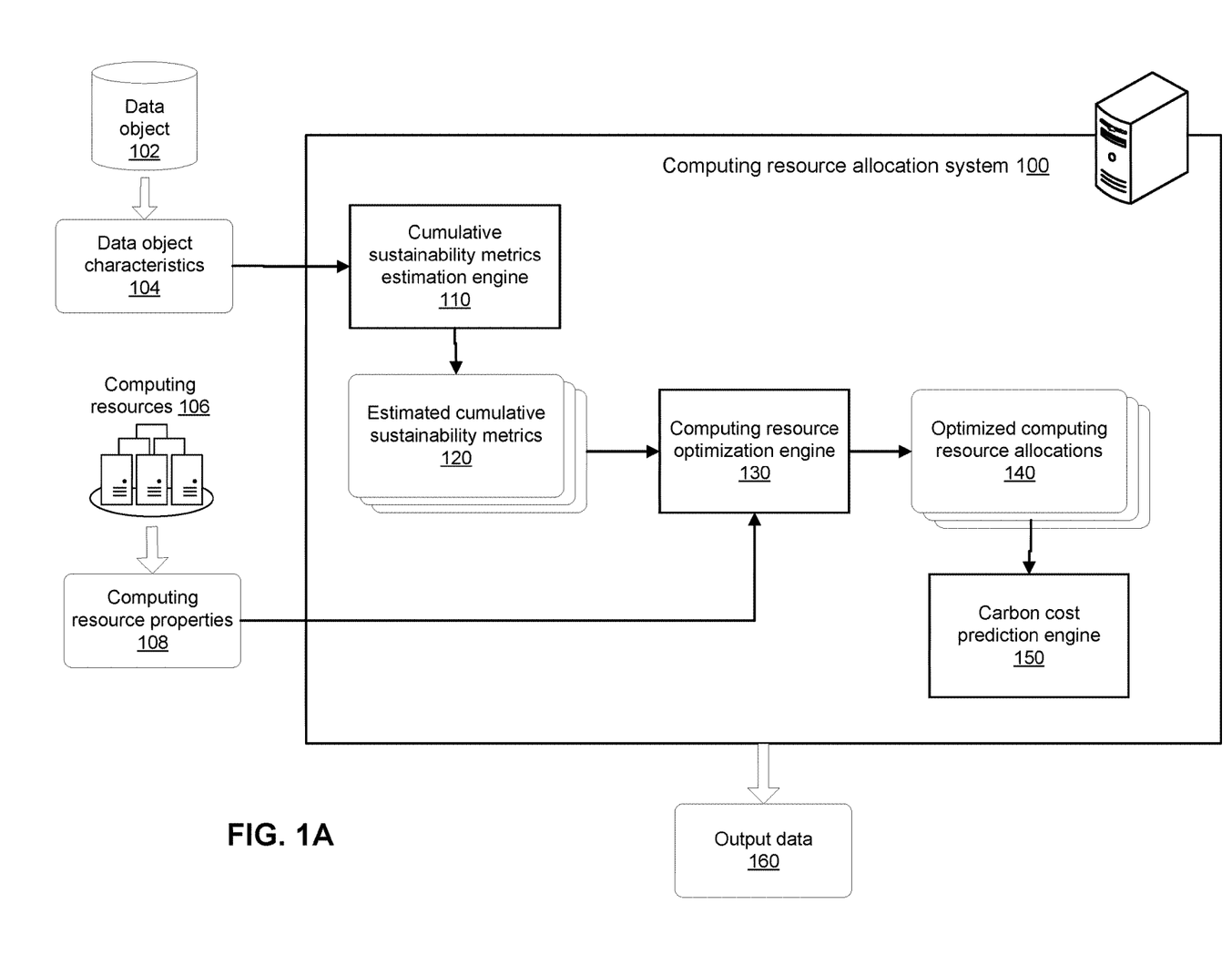
FIG. 1A shows an example allocation system for performing sustainability-based allocation of computing resources to data objects.

FIG. 1A shows an example system 100 for allocating computing resources. The system 100 is an example of a system implemented as computer programs on one or more computers in one or more locations, in which the systems, components, and techniques described below can be implemented.

The system 100 allocates one or more computing resources 106 to one or more data objects 102 based on characteristics 104 of the data objects 102 and properties 108 of the computing resources 106. As described in more detail below, the system 100 determines allocations of the computing resources 108 to the data object 102 to optimize one or more objectives including minimizing a cumulative carbon cost during the life-cycle of the data object 102.

Each data object 102 can be any type of collection of data that is electronically stored and accessed. Examples of data objects include electronic document files (e.g., WORD, PDF, or HTML files), multimedia files (e.g., MP3, MP4 or AVI files), database files (e.g., DB, MDB, or SQL files), executable files (EXE, ELF, or BAT files), and so on.

In general, the computing resources 106 include any hardware or software connected to or used in connection with the data object. In particular, the computing resources can include data storage resources (e.g., data storage platforms) for storing the data object 102, data processing resources (e.g., data processing platforms such as servers) for processing the data object 102, and network resources (e.g., communication networks) for transmitting and receiving the data object 102.

The life-cycle of the data object 102 generally includes the sequence of stages that the data object 102 goes through after its initial generation or capture up to its eventual archival and/or deletion at the end of its useful life. The stages can include, for example, maintenance of the data object prior to its use, active use of the data object, publication or transmission of the data object, archiving of the data object, and/or purging (i.e., deleting) of the data object.

In order to determine the optimal allocation of the computing resources 108 to a particular data object 102 for minimizing the cumulative carbon cost during the life-cycle of the particular data object 102, the system 100 estimates, by a cumulative sustainability metrics estimation engine 110 of the system, one or more cumulative sustainability metrics 120 from the characteristics 104 of the particular data object 102. The cumulative sustainability metrics 120 characterize one or more categories of energy consumption during a life-cycle of the particular data object. An example of estimating the cumulative sustainability metrics 120 of a particular data object is illustrated in FIG. 1B.

Figure 1B:
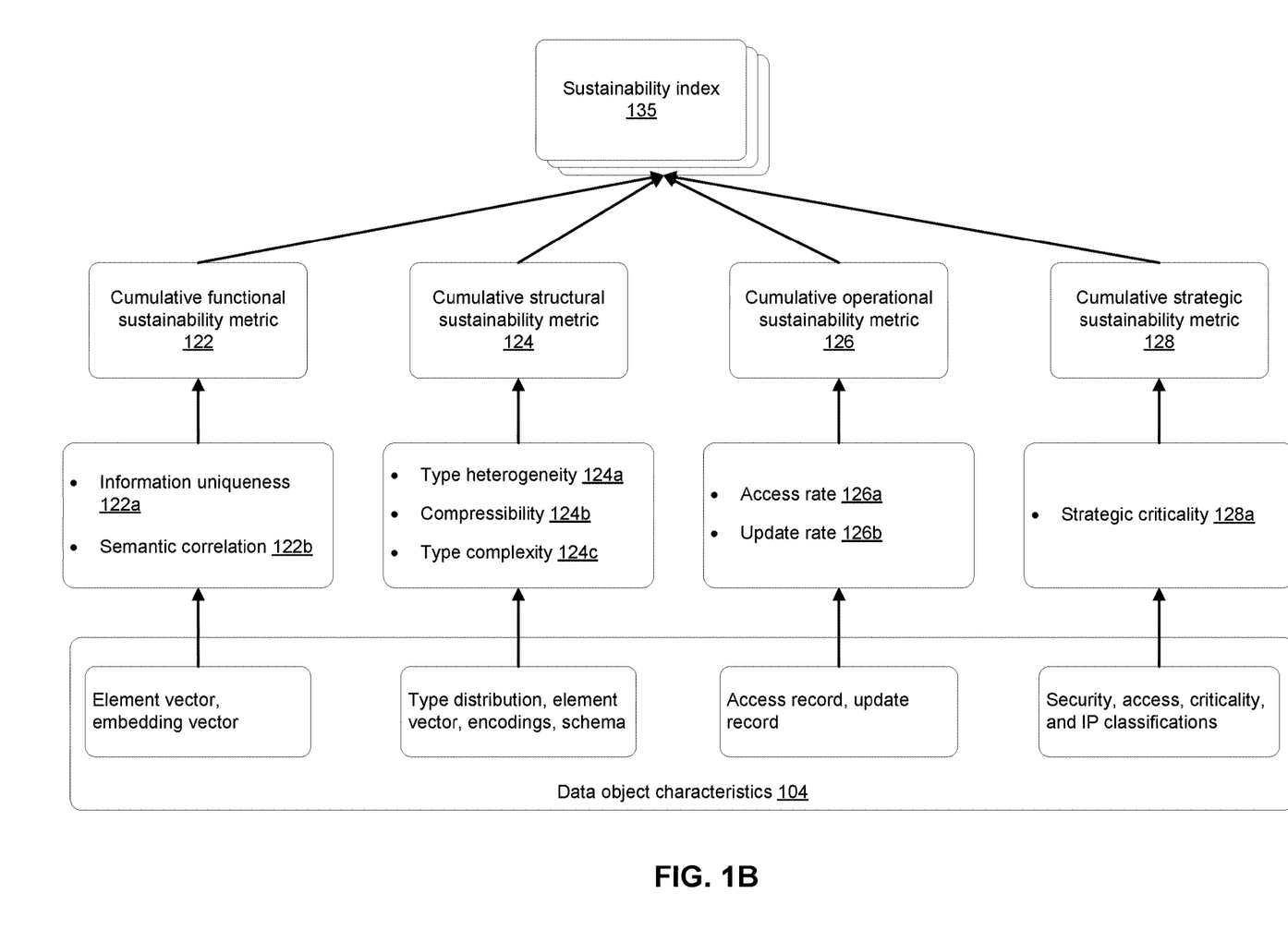
FIG. 1B shows an example process of determining optimized computing resource allocations for a data object.

As shown in FIG. 1B, the cumulative sustainability metrics 120 can include a cumulative functional sustainability metric 122, a cumulative structural sustainability metric 124, a cumulative operational sustainability metric 126, and a cumulative strategic sustainability metric 128. The cumulative functional sustainability metric 122 characterizes energy consumption of the data object related to information contents of the data object during the life-cycle of the data object. The cumulative structural sustainability metric 124 characterizes energy consumption related to data types of the data object during the life-cycle of the data object. The cumulative operational sustainability metric 126 characterizes energy consumption related to operations for accessing the data object during the life-cycle of the data object. The cumulative strategic sustainability metric 128 characterizes energy consumption related to maintaining strategic criticality of the data object during the life-cycle of the data object.

The cumulative functional sustainability metric 122 can be computed from an information uniqueness parameter 122a that characterizes an amount of unique information contained in the data object, and a semantic correlation parameter 122b that characterizes a proximity of the data object with other data objects in a corpus data objects in a data semantics space. Both the information uniqueness parameter 122a and the semantic correlation parameter 122b can be computed from some of the data object characteristics 104, as described below.

The information uniqueness parameter 122a is relevant to the sustainability of the data object because the amount of unique information contained in the data object with respect to a corpus of data objects is strongly correlated to the computing resources and energy consumption required for managing the information contained in the object during the life cycle of the data object.

To estimate the information uniqueness parameter 122a for a particular data object, the system can identify the informationally different elements constituting the particular data object in the corpus of data objects, and estimate the information uniqueness parameter 122a based on the informationally different elements constituting the particular data object.

For example, for the particular data object o in a corpus of data objects O, the system can identify a set of constituent elements of the data object o, e.g., by applying a chunking technique, as:

$$ch(o)=\{e_1, \ldots, e_k\}.$$

The system then applies element-level semantic matching to the set of constituent elements of the particular data object o with constituent elements of other data objects in the corpus O to identify unique elements. In particular, the system can separate the constituent elements of the data object o as:

$$ch(o)=Ch_{sim}(o)+Ch_{dif}(o),$$

where $ch_{sim}(o)$ is a set of constituent elements of o which are semantically similar to constituent elements of data objects in the corpus O, and $h_{dif}(o)$ is a set of constituent elements of o which are semantically different from constituent elements in other data objects in the corpus O.

For each constituent element $e_i \in ch(o)$ of the data object, the system can apply the best matching function bm25 to estimate relative information in $e_i$ with respect to corpus O as $$inf(e_i)=bm_{25}(e_i,O),$$

and estimate the unique information in the data object o with respective the corpus O as $$inf(o)=\Sigma_{e \in ch_{dif}(o)}inf(e).$$

Similarly, the system can estimate the redundant information in the data object o with respect to the corpus O as $$red(o)=\Sigma_{e \in ch_{sim}(o)}inf(e).$$

The system can estimate a ratio of unique information within the data object o with respect to the overall information in the data object o as $$r(o) = \frac{inf(o)}{inf(o) + \text{red}(o)}.$$

The ratio r(o) is an indicator of the unique information contained in the data object o and positively correlates to the minimum computing resources required for maintaining the unique information. On the other hand, 1−r(o) is an indicator of the redundant information contained in object o and indicates the extent of excess computing resources required for managing the redundant information. A lower r(o), e.g., r(o)<0.5 indicates that the data object o contains a significant amount of redundant information, and thus the computing resources required for managing the data object o may be sub-optimal. That is, if computing resources are allocated to o without considering its information uniqueness, a significant portion of the computing resources may not be optimally utilized. Thus, the system takes the information uniqueness parameter siginf(o)=r(o) into account in determining the optimal allocation of computing resources.

The semantic correlation parameter 122b is relevant to the sustainability of the data object because the utilization of shared computing resources among data objects can significantly minimize their overall energy consumption and in turn increases the sustainability of individual data objects. The semantic correlation parameter 122b characterizes the proximity of the data object with other data objects in the corpus in a data semantics space, and is an indicator of how much computing resources can be shared among the data objects.

In one example, to estimate the semantic correlation parameter 122b, the system map each data object o onto an embedding space E as a multidimensional vector v(o) of its features, and estimates the proximity between each pair of data objects as $$d(o_1, o_2) = \frac{\sum (\overrightarrow{v(o_1)}[i] \times \overrightarrow{v(o_2)}[i])}{\sqrt{\sum \overrightarrow{v(o_1)}[i]^2} \sqrt{\sum \overrightarrow{v(o_2)}[i]^2}}.$$

The system can estimate the expected proximity of a particular data object o to the other data objects in the corpus O as $$E_d(o) = \frac{1}{|o|} \sum\nolimits_{o' \in O} d(o, o'),$$

where $E_d(.)$ is the estimate of the semantic proximity of data objects within the corpus. That is, the semantic correlation parameter 122b can be estimated as $\text{sig}_{ord}(o) = E_d(O)$.

$E_d(O)$ is an indicator of the overall proximity of a data object o with other objects in the corpus and indicates how much computing resources required to maintain o can be shared with other objects. A higher $E_d(O)$, e.g., r(o)>0.5, indicates that object o can be maintained together with other data objects by sharing the same computing resources, On the other hand, a lower $E_d(o)$, e.g., i.e., $E_d(o)$<0.5 indicates that separate computational resources would be required to maintain o.

For example, for a corpus of images including 93% of the images depicting human faces and 3% of the images depicting stationery items. The 3% of images of stationery items (with low $E_d$ values) would need a separate allocation of computing resources to be managed. For example, when building a face recognition software, the 3% images of stationery items need to be identified and filtered out.

The system can estimate the cumulative functional sustainability metric 122 by processing the information uniqueness parameter 122a and the semantic correlation parameter 122b using a machine-learning model to compute the cumulative functional sustainability metric.

In some implementations, the system can estimate the cumulative functional sustainability metric 122 for the data object o using a weighted sum of the information uniqueness parameter 122a and the semantic correlation parameter 122b, as $$yfun(o) = Y_f \times \text{sig}_{inf}(o) + (1 - Y_f) \times \text{sig}_{ord}(o),$$

where the coefficient $Y_f \in [0,1]$ can be estimated by applying regression methods or specified by the operating environment, e.g., by default, $Y_f = 0.7$.

The cumulative structural sustainability metric 124 can be computed from a type heterogeneity parameter 124a that characterizes a variation of types of constituent elements in the data object, a compressibility parameter 124b that characterizes an intrinsic redundancy of the constituent elements in the data object, and a type-complexity parameter 124c that characterizes a structural complexity of the constituent elements in the data object. The type heterogeneity parameter 124a, the compressibility parameter 124b, and the type-complexity parameter 124c can be computed from some of the data object characteristics 104, as described below.

The degree of heterogeneity of different types of data elements in a data object is relevant to computing resource requirements because data objects (or in general, a corpus of data objects) require different computational processes to manage (e.g., read, write, process) different types of data elements. The type heterogeneity parameter 124a characterizes heterogeneity of different types of data within a data object (i.e., a multimedia file) or a corpus of data objects.

In some implementations, the system can estimate a distribution of various modalities in a data object o as $$Sig_{dis}(O) = \Sigma_{x \in X}(s(x) - \mu(O))^2$$

where X is the set of different modalities present in the data object ranged over by x, s(x) is the density of modality x within the data object o, and $$\mu(o) = \frac{1}{|X|} \sum s(x)$$

is the expected density of any modality within data object o. Here, a modality is a byte-stream with well-defined boundaries within a data object with a specific semantic interpretation.

The parameter $\text{sig}_{dis}(o)$ is an indicator of variation of types of constituents within data object o (or generally corpus of data objects) and indicates how many types of computing processes would be required to manage these different types of data. Each data type requires its own specific process to manage, e.g., editing an image within a document requires a different type of functionality as compared to editing tables. A higher $\text{sig}_{dis}(o)$, e.g., $\text{sig}_{dis}(o) > 1$, indicates that data object o may require execution of a large number of functionally different software to process the data object o, which in turn would imply lower sustainability and higher energy footprint.

For example, a database containing different types of audio clips may require more computation to process these files compared to a database of a single type of audio clips.

The presence of duplicate data elements within a data object reduces its sustainability and increases its resource requirement. The compressibility parameter 124b characterizes the intrinsic redundancy in the data object.

For the data object o with the respective constituent elements and corresponding frequencies of appearance ch(o) = $\{(e_1, n_1), \ldots, (e_k, n_k)\}$, the system can estimate the degree of compressibility for the data object as $$sig_{dc}(o) = 1 - \frac{k}{\sum n_i}.$$

The parameter $\text{sig}_{dc}(o)$ is an indicator of intrinsic redundancy of constituent elements within data object o and correlates to how much additional computing resources will be required to manage the redundant data, e.g., the processing time to run compression utility or storage for an uncompressed data object. A lower $\text{sig}_{dc}(o)$, e.g., $\text{sig}_{dis}(o) \to 0$ indicates that all constituent elements within object o are unique and therefore management and storage of the data object o will require an optimal level of resource allocation.

For example, a software architecture document containing initial versions of the architectural diagrams, which might be similar to the final architecture, would require more storage compared to a document with only the final architectural diagram.

The type-complexity parameter 124c is relevant to computing resource allocation because a data object with constituent elements that are interrelated in a complex manner requires the design of complex software to extract, store, and manage information from the data objects, which in turn, make such data objects difficult to sustain and their increase energy footprint.

In some implementations, to estimate the type-complexity parameter 124c, for a particular data object $o \in O$, the system identifies the different elementary data types constituting the schema sc(o) of the data object, as $d_{ele}(\text{sc}(o))$, identifies the number of sequential relations between elements of $d_{ele}(\text{sc}(o))$, as $n_{seq}(o)$, and identifies the number of non-sequential relations between elements of $d_{ele}(\text{sc}(o))$, as $n_{nseq}(o)$. The system can estimate the type-complexity parameter 124c as $$sig_{schema}(o) = \frac{n_{seq}(o) + n_{nseq}(o)}{\max_{o' \in O}\{n_{seq}(o') + n_{nseq}(o')\}}.$$

The parameter $\text{sig}_{schema}(o)$ is an indicator of the structural complexity of the data object. The higher structural complexity of a data object indicates the requirement for the design of more complex processes to extract, store, and manage information in the data object, which in turn, reduces its sustainability and energy requirements. For example, elementary schema types, e.g., numeric, characters, or RBG values, have low structural complexity, and are associated with high data sustainability and low energy requirements. Composite schema types which are sequential or linear combinations of elementary schemas, e.g., text, floating point numbers, or lists, have medium structural complexity, and are associated with medium data sustainability and medium energy requirements. Complex schema types which are non-sequential combinations of other schemas, e.g., graph data types, XML, or programming codes, have high structural complexity, and are associated with low data sustainability and high energy requirements.

The system can estimate the cumulative structural sustainability metric 124 by processing the type heterogeneity parameter 124a, the compressibility parameter 124b, and the type-complexity parameter 124c using a machine-learning model to compute the cumulative functional sustainability metric.

In some implementations, the system can estimate the cumulative structural sustainability metric 124 for the data object o using a weighted sum of the type heterogeneity parameter 124a, the compressibility parameter 124b, and the type-complexity parameter 124c, as)

$$y_{str}(O) = Y_{dis} \times sig_{dis}(o) + Y_{dc} \times sig_{dc}(o) + Y_{schema} \times sig_{schema}(o),$$

where the coefficients $Y_{dis}$, $Y_{dc}$ and $Y_{schema}$ can be estimated by applying regression methods or specified by the operating environment, e.g., by default, $Y_{ds}=0.4$, $Y_{dc}=0.2$, and $Y_{schema}=0.4$.

The cumulative operational sustainability metric 126 can be computed from an access rate parameter 126a which characterizes a rate of access to the data object and an update rate parameter 126b which characterizes a rate of updating the data object. Both the access rate parameter 126a and the update rate parameter 126b can be computed from some of the data object characteristics 104, as described below.

The access rate parameter 126a is relevant to computing resources allocation because the rate of access of a data object indicates the scale of its operational significance and is correlated with the choice of sustainable secondary or cloud storage to support its parallel access.

In some implementations, to estimate the access rate parameter 126a, the system identifies $F_\alpha = (f_{i_1} \leq f_{i_2} \ldots \leq f_{|o|})$, which is a sorted list of access frequencies of data objects in corpus O such that $f_{i_j}$ is the number of times the data object $o_{i_j} \in O$ has been accessed or is expected to be accessed within the time frame T. The system can estimate the rate of access of a particular data object o within the time frame T as $$r_a(o) = \frac{f_a(o)}{T}.$$

The system can estimate the access rate parameter 126a as $$sig_a(o) = \frac{1}{r_{amax}^2}(r_{amax} - r_a(o) + r_{amax} \times r_a(o)),$$

where $$r_{amax} = \max_{o \in O}(r_a(o))$$

is the maximum access rate.

The parameter $\text{sig}_a(o)$ is an indicator of computing resource requirements of storage and management infrastructure for the data object o as compared to the average requirement of other data objects in the corpus. A lower $\text{sig}_a(o)$ indicates that minimal infrastructure is required to provide access to object o. For example, bank records associated with a customer with a closed relationship with a bank would require only basic storage and little communication bandwidth as compared to one with an active relationship and frequent access.

Similar to the access rate parameter 126a, the update rate parameter 126b also indicates the operational significance and is correlated to the choice of sustainable primary storage, network bandwidth, as well as computing infrastructure to support simultaneous updates and synchronization of data.

In some implementations, to estimate the update rate parameter 126b, for a data object $o \in O$, the system determines the fraction of time $a(o) \in [0, 1]$ the data object o has been accessed or is expected to be accessed for an update within the time frame T, and determines the update frequency within T as $$f_u(o) = \alpha(o) \times f_\alpha(o).$$

The system estimates the rate of update of the data object within the time frame T as $$r_u(o) = \frac{f_u(o)}{T},$$

and estimates the update rate parameter 126b

$$sig_u(o) = \frac{1}{r_{umax}^2}(r_{umax} - r_u(o) + r_{umax} \times r_u(o)),$$

where $$r_{umax} = \max_{o \in O}(r_u(o))$$

is the maximum update rate. The parameter $sig_u(o)$ is an indicator of computing resource requirements for processing, storage, and management of the data object o as compared to the average requirement of other data objects in the corpus. A lower $sig_u(o)$ indicates less infrastructure is required to enable the updates to the data object o. For example, the trade record of a listed company on the stock exchange would require a highly scalable infrastructure as it gets updated with very high frequency compared to a Wikipedia article which might get updated only occasionally (even with a high access rate).

The system can estimate the cumulative operational sustainability metric 126 by processing the access rate parameter 126a and the update rate parameter 126b using a machine-learning model to compute the cumulative functional sustainability metric.

In some implementations, the system can estimate the cumulative operational sustainability metric 126 for the data object o using a weighted sum of the access rate parameter 126a and the update rate parameter 126b, as $$y_{op}(o) = Y_\alpha \times sig_\alpha(o) + (1-Y_\alpha) \times sig_u(o),$$

where the coefficient $Y_\alpha \in [0,1]$ can be estimated by applying regression methods or specified by operating environment, e.g., by default, $Y_\alpha = 0.4$.

The cumulative strategic sustainability metric 128 can be computed from a strategic criticality parameter 128a that characterizes the strategic significance of the data object for an operating environment the data object operates in, as described below.

The strategic criticality parameter 128a is relevant because the strategic criticality of a data object indicates its significance for the operating environment in aspects such as confidentiality, integrity, availability, and IP sensitivity.

In some implementations, to estimate the strategic criticality parameter 128a, the system performs sorting of the strategic criticalities of the data objects in a data object corpus O as $$L_{cri} = (h_1 > h_2 > \ldots > h_p),$$

such that for each object $o \in O$, $$h(o) = \alpha_{sec} l_{sec}(o) + \alpha_\alpha l_\alpha(o) + \alpha_{ip} l_{ip}(o) \alpha_{sec} + \alpha_\alpha + \alpha_{ip} = 1$$

where $l_{sec}(o)$ is the security level of the data object o, $\alpha_{sec}$ is the coefficient of the significance of the security of data objects ($\alpha_{sec} \in [0,1]$), $l_\alpha(o)$ is the access level of the data object o, $\alpha_\alpha$ is the coefficient of the significance of access to data objects ($\alpha_\alpha \in [0,1]$), $l_{ip}(o)$ is the IP sensitivity level of the data object o, and $\alpha_{ip}$ the coefficient of the significance of IP sensitivities of data objects ($\alpha_{ip} \in [0,1]$).

The system can estimate the strategic criticality parameter 128a based on the criticality level $h(o) \in L_{cri}$ of a particular data object $o_i \in O$ as $$sig_{cri}(o) = 1 - \frac{1}{p^2}(p - h(o) + p \times h(o)),$$

where p=maximum ordering level in $L_{cri}$.

The parameter $sig_{cri}(o)$ is an indicator of how much additional computing resources (e.g., in implementing security infrastructure) will be required to ensure strategic criticality requirements of object o as compared to the object with lowest criticality level. For example, consider two text documents: a first text document (T1) which contains medical diagnosis and prescription details, and a second text document (T2) which is a news article. T1 has a higher criticality level, and will likely require more complex (hence more computationally intensive) data management processes in places (e.g., encryption software) as compared to T2 (which may not need to be encrypted).

The system can estimate the cumulative strategic sustainability parameter 128 of the data object o as $$y_{stg}(o) = sig_{cri}(o).$$

The system can further compute a sustainability index 135 for a data object o from the cumulated sustainability metrics 120. For example, the system can use a machine-learning model to process an input including the cumulative functional sustainability metric 122, the cumulative structural sustainability metric 124, the cumulative operational sustainability metric 126, and the cumulative strategic sustainability metric 128 to compute the sustainability index 135, as $$SI(o) = f_{mL}(y_{fun}(o), y_{str}(o), y_{op}(o), 65_{stg}(o)).$$

The machine-learning model $f_{ML}(\ )$ can be a linear or non-linear function of the cumulative sustainability metrics 120 including $y_{fun}(o)$, $y_{str}(o)$, $y_{op}(o)$, and $y_{stg}(o)$. The model parameters can be determined using a training process based on training data.

In a particular example, the sustainability index of a data object o can be estimated as a linear convex combination of various cumulative sustainability metrics as $$SI(o) = \beta_{fun} \times y_{fun}(o) + \beta_{str} \times y_{str}(o) + \beta_{op} \times y_{op}(o) + \beta_{stg} \times y_{stg}(o),$$

where the parameters $\beta_{fun}, \ldots, \beta_{stg} \in [0..1]$ are relative significance coefficients of the cumulative functional, structural, operational, and strategic sustainability metrics with $\beta_{fun} + \ldots \beta_{stg} = 1$. The coefficients can be determined by applying regression methods or specified by the operating environment, e.g., by default, $\beta_{fun}=0.1$, $\beta_{str}=0.2$, $\beta_{op}=0.3$, and $\beta_{stg}=0.4$.

The sustainability index can take numerical (e.g. between "0" and 1) or categorical (e.g., High, Medium, Low) values. A lower sustainability index indicates that the data object requires a smaller amount of energy consumption to maintain, manage, and operate on the data object during its life cycle while a higher sustainability index indicates that the data object requires a larger amount of energy consumption during its life cycle.

Referring back to FIG. 1A, after the cumulative sustainability metrics 120 are estimated, the system 100 determines, by the computing resource optimization engine 130, optimized allocations 140 for the one or more computing resources 106 based on the estimated cumulative sustainability metrics 120 and the properties 108 of the computing resources 106.

In some implementations, the computing resource optimization engine 130 determines, based on the estimated cumulative sustainability metrics 120 and the properties 108 of the computing resources 106, an optimized allocation of a data storage resource to the data object, an optimized allocation of a data processing resource to the data object, and an optimized allocation of a network resource to the data object.

In some implementations, the data storage resource can include a plurality of data storage platforms, e.g., data servers. The computing resource optimization engine 130 can determine the optimal data storage platform to be allocated to the data object from the plurality of data storage platforms. For example, for each respective data storage platform in the plurality of data storage platforms, the computing resource optimization engine 130 estimates a respective suitability score for the respective data storage platform based on (1) the one or more of cumulative sustainability metrics and (2) one or more respective characteristic parameters of the respective data storage platform (e.g., a respective cost and a respective reliability parameter of the respective data storage platform), and selects the data storage platform having the maximum suitability score among the plurality of data storage platforms as the optimal data storage platform.

In a particular example, to estimate the respective suitability score for the respective data storage resource, the computing resource optimization engine 130 uses a machine-learning model to process an input specifying (1) the one or more of cumulative sustainability metrics and (2) the respective cost and the respective reliability parameter of the respective data storage platform, to compute the respective suitability score. That is, for each storage platform s, the computing resource optimization engine 130 estimates its suitability score for data object o as $$st(o,s)=f_{st}(y_{fun}(o),y_{str}(o),y_{op}(o),y_{stg}(o),\text{cost}(s),\text{reliability}(s)),$$

where the model $f_{st}(.)$ can be implemented by applying any suitable ML method. The parameter cost(s) is a cost index of the storage platform s as per its cost in comparison with other storage platforms. The parameter reliability (s) is a reliability index of the storage platform s in comparison with other storage platforms. The computing resource optimization engine 130 selects the optimal storage platform s* with highest value of st(-) as $$st(o, s^*) = \max_s \{st(o, s)\}.$$

The machine-learning model $f_{st}(.)$ can be trained to optimize one or more objectives including minimizing a cumulative carbon cost during the life-cycle of the data object with respect to data storage.

In a simplified model, the computing resource optimization engine 130 can estimate the suitability score of the data storage platform as $$st(o, s) \propto \frac{\text{cost}(s) \times \text{reliability}(s)}{SI(o)}.$$

That is, a data object with a lower sustainability index is stored in more reliable storage devices involving relatively higher costs.

In some implementations, the data processing resource can include a plurality of data processing platforms, e.g., data processing or data computation servers. The computing resource optimization engine 130 can determine the optimal data processing platform to be allocated to the data object from the plurality of data processing platforms. For example, for each respective data processing platform in the plurality of data storage platforms, the computing resource optimization engine 130 estimates a respective suitability score for the respective data processing platform based on (1) the one or more cumulative sustainability metrics and (2) one or more respective characteristic parameters of the respective data processing platform (e.g., a respective primary memory size and a respective floating point operations per second (FLOPS) of the respective data processing platform), and selects the data processing platform having the maximum suitability score among the plurality of data processing platforms as the optimal data storage platform.

In a particular example, to estimate the respective suitability score for the respective data processing resource, the computing resource optimization engine 130 uses a machine-learning model to process an input specifying (1) the one or more cumulative sustainability metrics and (2) the respective primary memory size and the respective FLOPS of the respective data processing platform, to compute the respective suitability score. That is, for each processing platform c, the computing resource optimization engine 130 estimates its suitability score for data object o as $$hw(o,c)=f_{hw}(y_{fun}(o),y_{str}(o)y_{op}(o),y_{stg}(o),RAM(c),\text{Flops}(c)),$$

and selects the optimal processing platform c* with highest value of hw(-) as $$st(o, c^*) = \max_c \{hw(o, c)\},$$

where the model $f_{hw}(.)$ can be implemented by applying any suitable ML method. The parameter RAM(c) is the size of primary memory associated computing platform c, and Flops (c) is the computational efficiency of the data processing architecture of c (e.g., CPU, GPU,) measured in terms of Flops.

The machine-learning model $f_{hw}(.)$ can be trained to optimize one or more objectives including minimizing a cumulative carbon cost during the life-cycle of the data object with respect to data processing.

In a simplified model, the computing resource optimization engine 130 can estimate the suitability score for the data processing platform as $$hw(o, c) \propto \frac{RAM(s) \times \text{Flops}(s)}{SI(o)}.$$

That is, applications for processing data objects with low sustainability index are executed on platforms having higher RAM capacity and computational efficiency.

In some implementations, the network resource can include a plurality of networks. The computing resource optimization engine 130 can determine the optimal network to be allocated to the data object from the plurality networks. For example, for each network in the plurality of networks, the computing resource optimization engine 130 estimates a respective suitability score for the respective network based on (1) the one or more cumulative sustainability metrics and (2) one or more respective characteristic parameters of the respective network (e.g., a respective bandwidth and a respective reliability measure of the respective network), and selects the network having the maximum suitability score among the plurality of networks as the optimal data storage platform.

In a particular example, to estimate the respective suitability score for the respective network, the computing resource optimization engine 130 uses a machine-learning model to process an input specifying (1) the one or more cumulative sustainability metrics and (2) the respective bandwidth and the respective reliability measure of the respective network, to compute the respective suitability score. That is, for each available network n, the computing resource optimization engine 130 estimates its suitability score for data object o as $$nw(o,n) = f_{nw}(y_{fun}(o), y_{str}(o), y_{op}(o), y_{stg}(o), \text{Bandwidth}(n), \text{nwReliability}(n)),$$

and selects the network n* with highest value of nw(-), as $$nw(o, n^*) = \max_n \{nw(o, n)\},$$

where the model $f_{nw}$ (.) can be implemented by applying any suitable ML method. The parameter Bandwidth (n) is the size of data-packets which can be transferred as a unit over network n, and the parameter nwReliability (n) is the expected data-loss during transmission over network n.

The machine-learning model $f_{nw}$ (.) can be trained to optimize one or more objectives including minimizing a cumulative carbon cost during the life-cycle of the data object with respect to data communication networks.

In a simplified model, the computing resource optimization engine 130 can estimate the suitability score of the network as $$nw(o, n) \propto \frac{\text{Bandwidth}(n) \times nwReliability(n)}{SI(o)}.$$

That is, data objects with low sustainability index are transmitted through networks with higher bandwidth and low transmission losses.

The system 100 further includes a carbon cost prediction engine 150 configured to estimates, from the determined allocations 140 of the one or more computing resources, an energy consumption level during the life-cycle of the data object with the optimal allocations of the computing resources.

In a particular example, the carbon cost prediction engine 150 estimates the carbon cost of the optimal storage platform, processing platform, and network channel, as an overall energy level allocation for a data object as $$\text{energy\_level}(o) = e_{st} * st(o) + e_{hw} * hw(o) + e_{nw} * nw(o),$$

where $e_{st}$ is the carbon cost of the unit storage (e.g., eCO2/byte), $e_{hw}$ is the carbon cost of the unit processing or computation (e.g., eCO2/flop), and $e_{nw}$ is the carbon cost of unit network transmission (e.g., eCo2/Mbps).

The system 100 can generate output data 160 based on the optimized allocation data 140 and/or the carbon cost predicted by the carbon cost prediction engine 150. The system 100 or another system can use the output data 160 to allocate the one or more computing resources 106 to each of the data object 102 to achieve the optimized objectives including minimizing a cumulative carbon cost during the life-cycle of the data object. For example, the system 100 or another system can implement an automated process to assign a particular data storage platform, a particular data processing platform, and/or a particular communication network to the data object according to the output data 160. The automated process can include determining the particular data storage platform, the particular data processing platform, and the particular communication network based on the output data 160, storing the data object on the particular data storage platform, starting using the particular data processing platform to manage and process the data object, and/or using the particular communication network to transmit the data object.

Figure 2:
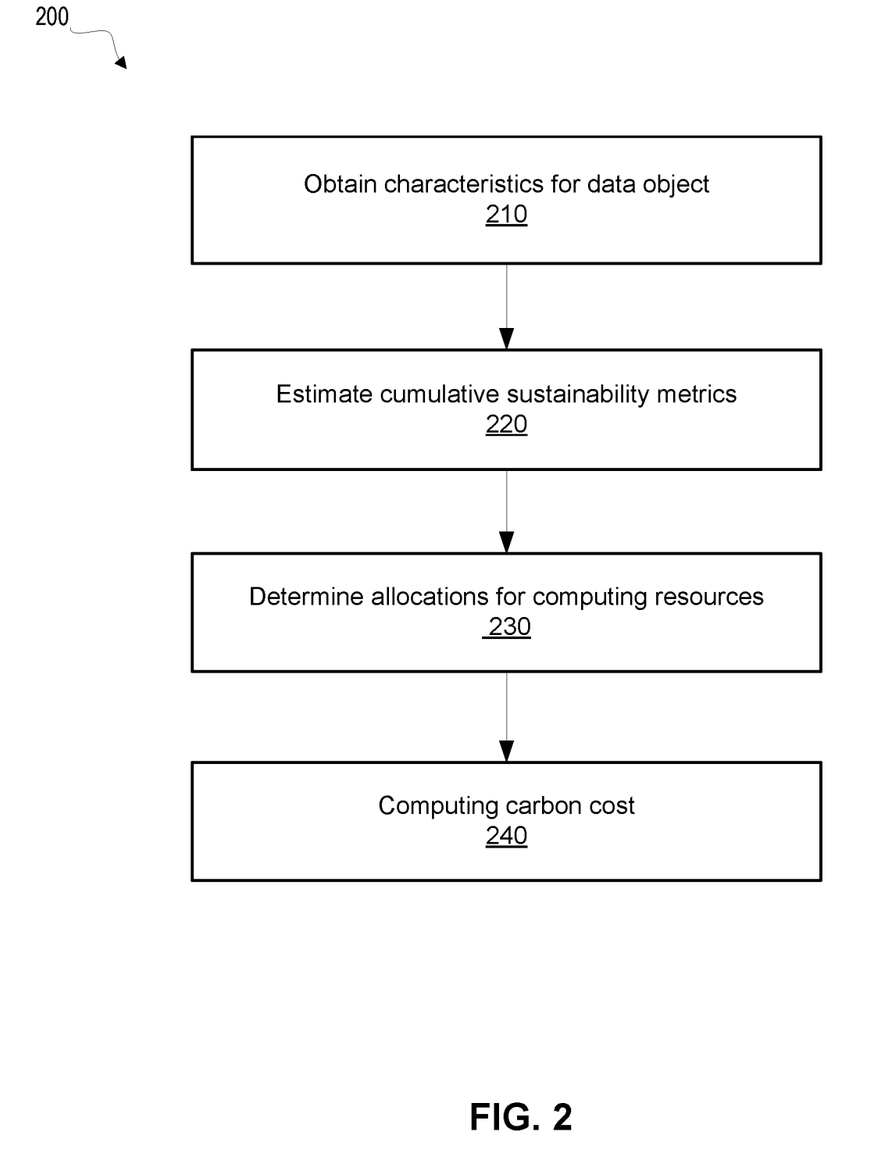
FIG. 2 is a flow diagram illustrating an example process for allocating computing resources to data objects.

FIG. 2 is a flow diagram illustrating an example process 200 for performing sustainability-based allocation of computing resources to data objects. For convenience, the process 200 will be described as being performed by a system of one or more computers located in one or more locations. For example, the system 100 described with reference to FIG. 1, appropriately programmed in accordance with this specification, can perform the process 200.

In step 210, the system obtains a plurality of characteristics of a data object. For example, the plurality of characteristics can include one or more of: the constituent elements of the data object, the data types of the constituent elements, the access and update records of the data object, and the security, access, criticality, and/or the IP classification of the data object.

In step 220, the system estimates, from the obtained characteristics, one or more cumulative sustainability metrics characterizing one or more categories of energy consumption during a life-cycle of the data object. For example, the cumulative sustainability metrics can include one or more of: a cumulative functional sustainability metric characterizing energy consumption related to information contents of the data object during the life-cycle of the data object, a cumulative structural sustainability metric characterizing energy consumption related to data types of the data object during the life-cycle of the data object, a cumulative operational sustainability metric characterizing energy consumption related to operations for accessing the data object during the life-cycle of the data object, and/or a cumulative strategic sustainability metric characterizing energy consumption related to maintaining strategic criticality of the data object during the life-cycle of the data object.

In step 230, the system determines, from the cumulative sustainability metrics, allocations of one or more computing resources to the data object to optimize one or more objectives including minimizing a cumulative carbon cost during the life-cycle of the data object. For example, the system can determine the optimized allocation of one or more of: an optimized allocation of a data storage resource to the data object, an optimized allocation of a data processing resource to the data object, and/or an optimized allocation of a network resource to the data object.

In step 240, the system estimates, from the determined allocations of one or more computing resources, an energy consumption level during the life-cycle of the data object. The energy consumption level during the life-cycle of the data object is directly related to the life-cycle carbon cost of the data object based on the optimal allocations of the computing resources.

Figure 3:
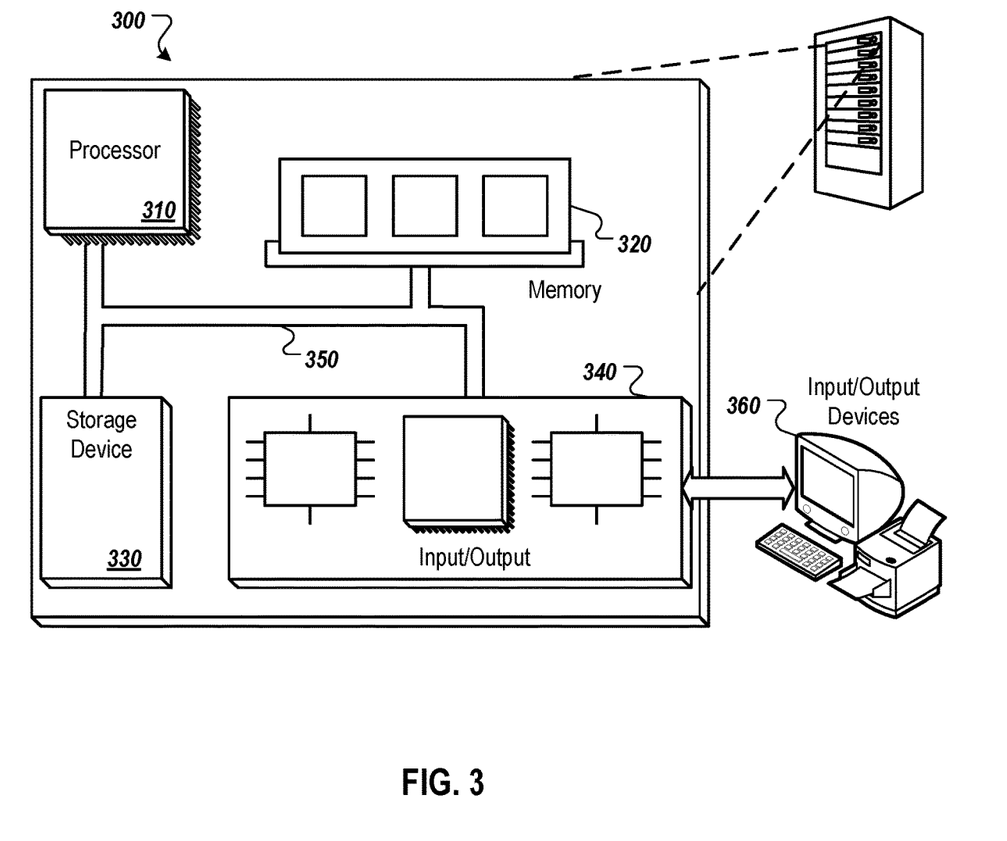
FIG. 3 shows an example computer system for performing operations for allocating computing resources to data objects.

FIG. 3 shows an example computer system 300 that can be used to perform certain operations described above, for example, to perform the operations of the system 100 of FIG. 1. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (for example, a cloud storage device), or some other large-capacity storage device.

The input/output device 340 provides input/output operations for the system 300. In one implementation, the input/output device 340 can include one or more network interface devices, for example, an Ethernet card, a serial communication device, for example, a RS-232 port, and/or a wireless interface device. In another implementation, the input/output device can include driver devices configured to receive input data and send output data to other input/output devices, for example, keyboard, printer and display devices 360. Other implementations, however, can also be used, such as mobile computing devices, mobile communication devices, set-top box television client devices, etc.

Although an example system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for allocating computing resources, comprising:
   obtaining a plurality of characteristics of a data object;
   estimating, from the obtained characteristics, one or more cumulative sustainability metrics characterizing one or more categories of energy consumption during a life-cycle of the data object, wherein the one or more cumulative sustainability metrics comprise one or more of:
   a cumulative functional sustainability metric characterizing energy consumption related to information contents of the data object during the life-cycle of the data object;

a cumulative structural sustainability metric characterizing energy consumption related to data types of the data object during the life-cycle of the data object;

a cumulative operational sustainability metric characterizing energy consumption related to operations for accessing the data object during the life-cycle of the data object; or a cumulative strategic sustainability metric characterizing energy consumption related to maintaining strategic criticality of the data object during the life-cycle of the data object; and wherein the estimating comprises:
  estimating, from one or more of the plurality of characteristics of the data object, one or more of:
    a type heterogeneity parameter characterizing a variation of types of constituent elements in the data object;
    a compressibility parameter characterizing an intrinsic redundancy of the constituent elements in the data object; or
    a type-complexity parameter characterizing a structural complexity of the constituent elements in the data object; and
  estimating the cumulative structural sustainability metric from one or more of the type heterogeneity parameter, the compressibility parameter, or the type-complexity parameter; and determining, from the cumulative sustainability metrics, allocations of one or more computing resources to the data object to optimize one or more objectives including minimizing a cumulative carbon cost during the life-cycle of the data object.

2. The computer-implemented method of claim 1, wherein estimating the one or more cumulative sustainability metrics comprises estimating the cumulative functional sustainability metric, comprising:
  estimating, from one or more of the plurality of characteristics of the data object, one or more of:
    an information uniqueness parameter characterizing an amount of unique information contained in the data object; or
    a semantic correlation parameter characterizing a proximity of the data object with other data objects in a corpus data objects in a data semantics space; and
  estimating the cumulative functional sustainability metric from the information uniqueness parameter and/or the semantic correlation parameter.

3. The computer-implemented method of claim 1, wherein estimating the one or more cumulative sustainability metrics comprises estimating the cumulative operational sustainability metric, comprising:
  estimating, from one or more of the plurality of characteristics of the data object, one or more of:
    an access rate parameter characterizing a rate of access to the data object; or
    an update rate parameter characterizing a rate of updating the data object; and
  estimating the cumulative operational sustainability metric from the access rate parameter and/or the update rate parameter.

4. The computer-implemented method of claim 1, wherein estimating the one or more cumulative sustainability metrics comprises estimating the cumulative strategic sustainability metric, comprising:
  estimating, from one or more of the plurality of characteristics of the data object, a strategic criticality parameter characterizing a strategic significance of the data object for an operating environment the data object operates in; and
  estimating the cumulative strategic sustainability metric from the strategic criticality parameter.

5. The computer-implemented method of claim 1, further comprising:
  estimating, from the determined allocations of the one or more computing resources, an energy consumption level during the life-cycle of the data object.

6. The computer-implemented method of claim 1, wherein determining the allocation of one or more computing resources to the data object comprises one or more of:
  determining an optimized allocation of a data storage resource to the data object;
  determining an optimized allocation of a data processing resource to the data object; or
  determining an optimized allocation of a network resource to the data object.

7. The computer-implemented method of claim 1, wherein determining allocations of the one or more computing resources to the data object comprises determining an optimal data storage platform from a plurality of data storage platforms to be allocated to the data object, comprising:
  for each respective data storage platform in the plurality of data storage platforms, estimating a respective suitability score for the respective data storage platform based on (1) the one or more cumulative sustainability metrics and (2) one or more respective characteristic parameters of the respective data storage platform; and
  selecting the data storage platform having a maximum suitability score among the plurality of data storage platforms as the optimal data storage platform.

8. The computer-implemented method of claim 7, wherein the one or more respective characteristic parameters of the respective data storage platform comprise a respective cost and a respective reliability parameter of the respective data storage platform.

9. The computer-implemented method of claim 8, wherein estimating the respective suitability score for the respective data storage platform comprising:
  processing an input specifying (1) the one or more cumulative sustainability metrics and (2) the respective cost and the respective reliability parameter of the respective data storage platform using a first machine-learning model to compute the respective suitability score.

10. The computer-implemented method of claim 1, wherein determining allocations of the one or more computing resources to the data object comprises determining an optimal data processing platform from a plurality of data processing platforms to be allocated to the data object, comprising:
  for each respective data processing platform in the plurality of data processing platforms, estimating a respective suitability score for the respective data processing platform based on (1) the one or more cumulative sustainability metrics and (2) one or more respective characteristic parameters of the respective data processing platform; and
  selecting the data processing platform having the maximum suitability score among the plurality of data processing platforms as the optimal data processing platform.

11. The computer-implemented method of claim 10, wherein the one or more respective characteristic parameters of the respective data processing platform comprise a respective primary memory size and a respective floating point operations per second (FLOPS) of the respective data processing platform.

12. The computer-implemented method of claim 11, wherein estimating the respective suitability score for the respective data processing platform comprises:
   processing an input specifying (1) the one or more cumulative sustainability metrics and (2) the respective primary memory size and the respective FLOPS of the respective data processing platform using a second machine-learning model to compute the respective suitability score.

13. The computer-implemented method of claim 1, wherein determining allocations of the one or more computing resources to the data object comprises determining an optimal network from a plurality of networks to be allocated to the data object, comprising:
   for each respective network in the plurality of networks, estimating a respective suitability score for the respective network based on (1) the one or more cumulative sustainability metrics and (2) one or more respective characteristic parameters of the respective network; and
   selecting the network having the maximum suitability score among the plurality of networks as the optimal network.

14. The computer-implemented method of claim 13, wherein the one or more respective characteristic parameters of the respective network comprise a respective bandwidth and a respective reliability measure of the respective network.

15. The computer-implemented method of claim 14, wherein estimating the respective suitability score for the respective network comprises:
   processing an input specifying (1) the one or more cumulative sustainability metrics and (2) the respective bandwidth and the respective reliability measure of the respective network using a third machine-learning model to compute the respective suitability score.

16. A system comprising one or more computers and one or more storage devices storing instructions that when executed by the one or more computers, cause the one or more computers to perform:
   obtaining a plurality of characteristics of a data object;
   estimating, from the obtained characteristics, one or more cumulative sustainability metrics characterizing one or more categories of energy consumption during a life-cycle of the data object, wherein the one or more cumulative sustainability metrics comprise one or more of:
      a cumulative functional sustainability metric characterizing energy consumption related to information contents of the data object during the life-cycle of the data object;
      a cumulative structural sustainability metric characterizing energy consumption related to data types of the data object during the life-cycle of the data object;
      a cumulative operational sustainability metric characterizing energy consumption related to operations for accessing the data object during the life-cycle of the data object; or
      a cumulative strategic sustainability metric characterizing energy consumption related to maintaining strategic criticality of the data object during the life-cycle of the data object; and
   wherein the estimating comprises:
      estimating, from one or more of the plurality of characteristics of the data object, one or more of:
         a type heterogeneity parameter characterizing a variation of types of constituent elements in the data object;
         a compressibility parameter characterizing an intrinsic redundancy of the constituent elements in the data object; or
         a type-complexity parameter characterizing a structural complexity of the constituent elements in the data object; and
      estimating the cumulative structural sustainability metric from one or more of the type heterogeneity parameter, the compressibility parameter, or the type-complexity parameter; and
   determining, from the cumulative sustainability metrics, allocations of one or more computing resources to the data object to optimize one or more objectives including minimizing a cumulative carbon cost during the life-cycle of the data object.

17. The system of claim 16, wherein the instructions further cause the one or more computers to perform:
   estimating, from the determined allocations of one or more computing resources and the one or more cumulative sustainability metrics of the data object, an energy consumption level during the life-cycle of the data object.

18. One or more computer-readable storage media storing instructions that, when executed by one or more computers, cause the one or more computers to perform:
   obtaining a plurality of characteristics of a data object;
   estimating, from the obtained characteristics, one or more cumulative sustainability metrics characterizing one or more categories of energy consumption during a life-cycle of the data object, wherein the one or more cumulative sustainability metrics comprise one or more of:
      a cumulative functional sustainability metric characterizing energy consumption related to information contents of the data object during the life-cycle of the data object;
      a cumulative structural sustainability metric characterizing energy consumption related to data types of the data object during the life-cycle of the data object;
      a cumulative operational sustainability metric characterizing energy consumption related to operations for accessing the data object during the life-cycle of the data object; or
      a cumulative strategic sustainability metric characterizing energy consumption related to maintaining strategic criticality of the data object during the life-cycle of the data object; and
   wherein the estimating comprises:
      estimating, from one or more of the plurality of characteristics of the data object, one or more of:
         a type heterogeneity parameter characterizing a variation of types of constituent elements in the data object;
         a compressibility parameter characterizing an intrinsic redundancy of the constituent elements in the data object; or
         a type-complexity parameter characterizing a structural complexity of the constituent elements in the data object; and
      estimating the cumulative structural sustainability metric from one or more of the type heterogeneity parameter, the compressibility parameter, or the type-complexity parameter; and determining, from the cumulative sustainability metrics, allocations of one or more computing resources to the data object to optimize one or more objectives including minimizing a cumulative carbon cost during the life-cycle of the data object.

* * * * *